United States Patent
Sun et al.

(10) Patent No.: US 9,963,548 B1
(45) Date of Patent: May 8, 2018

(54) SOLVENT RESISTANT, AROMATIC POLYAMIDE FILMS FOR TRANSPARENT FLEXIBLE SUBSTRATES

(71) Applicant: AKRON POLYMER SYSTEMS, INC., Akron, OH (US)

(72) Inventors: Limin Sun, Copley, OH (US); Dong Zhang, Uniontown, OH (US); Frank W. Harris, Boca Raton, FL (US); Jiaokai Jing, Uniontown, OH (US)

(73) Assignee: Akron Polymer Systems, Inc., Akron, OH (US)

(*) Notice: Subject to any disclaimer, the term of this patent is extended or adjusted under 35 U.S.C. 154(b) by 0 days. days.

(21) Appl. No.: 13/868,637

(22) Filed: Apr. 23, 2013

Related U.S. Application Data

(60) Provisional application No. 61/637,480, filed on Apr. 24, 2012.

(51) Int. Cl.
*B32B 27/08* (2006.01)
*C08G 69/32* (2006.01)

(52) U.S. Cl.
CPC .................................. *C08G 69/32* (2013.01)

(58) Field of Classification Search
CPC ........ C08G 69/12; C08G 69/02; C08G 69/04; C08G 69/48; Y10T 428/1018; Y10T 428/31725
USPC ........................ 428/474.4; 525/432, 425, 50; 528/271–369
See application file for complete search history.

(56) References Cited

U.S. PATENT DOCUMENTS

| | | | | |
|---|---|---|---|---|
| 2,863,857 A * | 12/1958 | Costain | ................... | C08G 69/02 528/329.1 |
| 3,386,965 A * | 6/1968 | Huffman | ................ | C08G 69/32 521/42.5 |
| 3,560,137 A * | 2/1971 | Hahn | ...................... | D01F 6/605 264/184 |
| 4,384,107 A | 5/1983 | Rogers et al. | | |
| 5,026,819 A * | 6/1991 | Irwin | ...................... | C08G 69/32 264/178 F |
| 5,039,785 A * | 8/1991 | Irwin | ...................... | C08G 69/28 524/606 |
| 5,189,141 A * | 2/1993 | Irwin | ...................... | C08G 69/28 524/606 |
| 5,202,410 A * | 4/1993 | Irwin | .................... | C07C 229/60 528/183 |
| 2009/0318660 A1* | 12/2009 | Bos | ........................ | C08G 69/32 528/310 |
| 2010/0036085 A1* | 2/2010 | Oh | ......................... | C08G 69/12 528/391 |
| 2012/0123041 A1* | 5/2012 | Zaher | ..................... | C08G 69/26 524/504 |

FOREIGN PATENT DOCUMENTS

| | | | |
|---|---|---|---|
| JP | 2007063417 A | | 3/2007 |
| JP | 2007231224 A | | 9/2007 |
| JP | 2009079210 A | * | 4/2009 |
| JP | 2009079210 A | * | 4/2009 |
| WO | 2013006452 A2 | | 4/2013 |

OTHER PUBLICATIONS

AIPN Machine Translation of JP 2009079210 A.*
JP 2009079210 A Machine Translation.*
Liu, et al. "High Performance Organic-Inorganic Hybrid Plastic Substrate for Flexible Display and Electronics" pp. 913-916, SID 10 Digest—2010.
Li, et al. "Polyimide Films as Negative Birefringent Compensators for Normally White Twisted Nematic Liquid Crystal Displays" pp. 5321-5325, Polymer, vol. 37, No. 23, 1996.
Ito, et al. "Plastic Substrates for Flexible Displays" pp. 4325-4329, Japanese Journal of Applied Physics, vol. 45, No. 5B—2006.
Mathews, et al. "Fully Aliphatic Polyimides from Adamantane-Based Diamines for Enhanced Thermal Stability, Solubility, Transparency, and Low Dielectric Constant" pp. 3316-3326, Published online in Wiley InterScience (www.interscience.wiley.com), Apr. 2006.
Negi, et al. "Soluble Aromatic Polyamides and Copolyamides" pp. 391-403, J.M.S.—Rev. Macromol. Chem. Phys., c39 (3), 391-403 (1999).

* cited by examiner

*Primary Examiner* — Maria V Ewald
*Assistant Examiner* — Travis M Figg
(74) *Attorney, Agent, or Firm* — Benesch, Friedlander, Coplan & Aronoff LLP

(57) ABSTRACT

Solvent resistant, transparent films prepared from solutions of aromatic polyamides and multi-functional carboxylic acids in polar aprotic solvents are described herein. Solvent resistance is achieved by heating the films for a short time above 300° C. near the polyamide Tg. The films have CTEs less than 40 ppm/° C. and are optically clear displaying transmittance above 75% between 400 and 750 nm. The films are useful as substrates for flexible electronic devices.

12 Claims, No Drawings

SOLVENT RESISTANT, AROMATIC POLYAMIDE FILMS FOR TRANSPARENT FLEXIBLE SUBSTRATES

This application claims priority to U.S. Ser. No. 61/637,480, filed Apr. 24, 2012, the contents of which are incorporated herein by reference.

FIELD

The invention relates to the manufacture of thermally and dimensionally stable transparent polymer films. More particularly, the invention relates to the manufacture and use of aromatic polyamides, which have a rigid backbone and are still soluble in conventional organic solvents. The polymer films can be prepared by solution casting, and cured at elevated temperatures. The cured films show a high optical transparency over a range of 400~750 nm (a transmittance greater than 75% at 400 nm and greater than 85% at 750 nm), a low coefficient of thermal expansion (CTE less than 40 ppm/° C.), a high glass transition temperature ($T_g$ greater than 300° C.), and good solvent resistance. The films are useful as substrates for flexible electronic devices.

BACKGROUND

Organic Light Emitting Diode (OLED) displays were a $1.25 billion market in 2010, which is projected to grow annually at a rate of 25%. The high efficiency and high contrast ratio of OLED displays make them a suitable replacement for liquid crystal displays (LCDs) in the mobile phone display, digital camera, and global positioning system (GPS) market segments. These applications place a premium on high electrical efficiency, compact size, and robustness. This has increased the demand for active matrix OLEDs (AMOLEDs) which consume less power, have faster response times, and higher resolutions. AMOLED innovations that improve these properties will further accelerate AMOLED adoption into portable devices and expand the range of devices that use them. These performance factors are largely driven by the processing temperature of the electronics. AMOLEDs have a thin-film transistor (TFT) array structure which is deposited on the transparent substrate. Higher TFT deposition temperatures can dramatically improve the electrical efficiency of the display. Currently, glass plates are used as AMOLED substrates. They offer high processing temperatures (>500° C.) and good barrier properties, but are relatively thick, heavy, rigid, and are vulnerable to breaking, which reduces product design freedom and display robustness. Thus, there is a demand by portable device manufacturers for a lighter, thinner, and more robust replacement. Flexible substrate materials would also open new possibilities for product design, and enable lower cost roll-to-roll fabrication. Such substrates could also be used in the production of liquid crystal displays.

Many polymer thin films have excellent flexibility, transparency, are relatively inexpensive, and are lightweight. Polymer films are excellent candidates for substrates for flexible electronic devices, including flexible displays and flexible solar cell panels, which are currently under development. Compared to rigid substrates like glass, flexible substrates offer some potentially significant advantages in electronic devices, including:

a. Light weight (glass substrates represent about 98% of the total weight in a thin film solar cell).

b. Flexible (Easy to handle, low transportation costs, and/or more applications for both raw materials and products.)

c. Amenable to roll-to-roll manufacturing, which could greatly reduce the manufacturing costs.

To facilitate these inherent advantages of a polymeric substrate for the flexible display application, several issues must be addressed including:

a. Increasing the thermal stability;

b. Reducing the coefficient of thermal expansion (CTE);

c. Maintaining high transparency during high temperature processing; and, d. Increasing the oxygen and moisture barrier properties. Currently, no pure polymer film can provide sufficient barrier properties. To achieve the target barrier property, an additional barrier layer must be applied.

Several polymer films have been evaluated as transparent flexible substrates, including: polyethylene terephthalate (PET), polyethylene naphthalate (PEN), polycarbonate (PC), polyethersulfone (PES), cyclic olefin polymer (COP), polyarylates (PAR), polyimides (PI), and others. However, no one film can meet all the requirements. Currently, the industrial standard for this application is PEN film, which meets part of the requirements (Transmittance>80% between 400 nm and 750 nm), but has a limited use temperature (<200° C.). A transparent polymer film with a higher thermal stability ($T_g$>300° C.) is needed to allow a flexible electronic device to be fabricated at the desired higher temperatures.

Conventional aromatic polyimides are well known for their excellent thermal and mechanical properties, but their films, which must be cast from their polyamic acid precursors, are usually dark yellow to orange. Some aromatic polyimides have been prepared that can be solution cast into films that are colorless in the visible region, but such films still absorb light near 400 nm and do not display the required low CTE (For example, F. Li. F. W. Harris, and S. Z. D. Cheng, Polymer, 37, 23, pp 5321 1996). The films are also not solvent resistant. Polyimide films based on part or all alicyclic monomers, such as those described in patents JP 2007-063417 and JP 2007-231224, and publication by A. S. Mathews et al (J. Appl. Polym. Sci., Vol. 102, 3316-3326, 2006), show improved transparency. Although $T_g$s of these polymers can be higher than 300° C., at these temperatures, the polymers do not show sufficient thermal stability due to their aliphatic units.

Fiber reinforced polymer composite films, such as reported by H. Ito (Jap. J. Appl. Phys., 45, No. 5B, pp 4325, 2006), combine the dimensional stability of fiber glass in a polymer film, offering an alternative way to achieve a low CTE. However, in order to maintain a high transparency, the refractive indices of the matrix polymer and the fiber must be precisely matched, which greatly limits the choice of the matrix polymer within an organic silicon resin. By using nanoparticles as filler, the effect of lowering CTE is not significant (J M Liu, et al, J. SID, Vol. 19, No. 1, 2011)

Although most aromatic polyamides are poorly soluble and cannot be solution cast into films, a few polymers have been prepared that are soluble in polar aprotic solvents containing inorganic salts. Some of these have been investigated for use as flexible substrates. For example, JP 2009-79210A describes a thin film prepared from a fluorine containing aromatic polyamide that displays a very low CTE (<0 ppm/° C.), good transparency (T %>80 between 450~700 nm), and excellent mechanical properties. However, the maximum thickness of films made from this polymer is 20 μm, because a dry-wet method where the residual salt is removed must be used for the film preparation. The film also displays poor resistance to strong organic solvents, which greatly reduces its utility. In fact, there have been few attempts to increase the solvent resistance of aromatic polyamides through crosslinking because most are inherently solvent resistant. However, one method to increase the solvent resistance of soluble aromatic polyamides using multifunctional epoxides has been described in PCT WO2013/006452 A2.

SUMMARY

The present invention is directed toward transparent films prepared from aromatic polyamides that are soluble in polar aprotic solvents without the presence of inorganic salts, the polyamides having a $T_g$ greater than 300° C., and the films having a CTE less than 40 ppm/° C. The films are cast from a solution of the polyamide in polar aprotic solvents such as N,N-dimethylformamide (DMF), N,N-dimethylacetamide (DMAc) or N-methylpyrrolidinone (NMP). The polyamide can be produced in the absence of an inorganic salt. Surprisingly, it has been discovered that when a small amount of a multifunctional aromatic carboxylic acid is incorporated in the polymer film, and the film is subsequently heated at elevated temperatures, it becomes solvent resistant, while its transparency is not significantly decreased.

According to one aspect of this invention, a process is provided for manufacturing a thermally and dimensionally stable, solvent resistant, transparent aromatic polyamide film comprising the steps of: (A) dissolving one or more aromatic diamines in a polar solvent; (B) reacting the diamine mixture with at least one aromatic diacid dichloride, wherein hydrochloric acid and a polyamide solution is generated; (C) removing the free hydrochloric acid by reaction with a reagent; (D) adding a small amount of a multifunctional aromatic carboxylic acid; (E) casting the polyamide solution into a film; (F) heating the film at a temperature near the polyamide Tg. The heating is carried out for several minutes under an inert atmosphere or under reduced pressure. After the heating process, the a solvent resistant test is conducted by immersing the film in commonly used organic solvents, including NMP, DMAc, DMSO, etc., for 30 minutes at room temperature. To be considered solvent resistant the film must not undergo dissolution or swelling and be substantially free of surface wrinkles or any damage.

According to another aspect of this invention, a transparent aromatic polyamide film is produced having repeat units of a general formula (I)

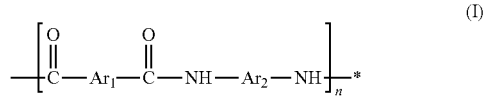

wherein $Ar_1$ is selected from the group of aromatic units as shown in the following general structures:

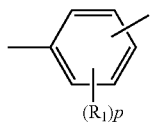 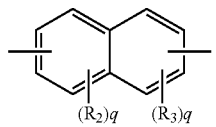

-continued

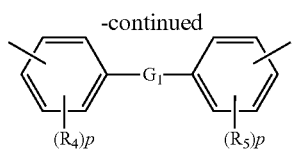

Wherein p is 1 to 4, q is 1 to 3; $R_1$, $R_2$, $R_3$, $R_4$, $R_5$ are selected from the group consisting of hydrogen, halogen, viz. fluoride, chloride, bromide and iodide, alkyl, substituted alkyl such as halogenated alkyls, nitro, cyano, thioalkyl, alkoxy, aryl, or substituted aryl such as halogenated aryls, alkyl ester and substituted alkyl esters and combinations thereof. When p is less than 1 or q is less than 3 the remaining positions on the aromatic ring are assumed by hydrogen atoms.

$G_1$ is selected from a group consisting of a covalent bond, a $CH_2$ group, a $C(CH_3)_2$ group, a $C(CF_3)_2$ group, a $C(CX_3)_2$ group wherein X is a halogen; a CO group, an O atom, a S atom, a $SO_2$ group, a $Si(CH_3)_2$ group; 9, 9-fluorene group or substituted 9, 9-fluorene; a OZO group wherein Z is a aryl group or substituted aryl such as phenyl group, biphenyl group, perfluorobiphenyl group, 9, 9-bisphenylfluorene group or substituted 9, 9-bisphenylfluorene.

And $Ar_2$ is selected from the group of aromatic units as shown in the following general structures:

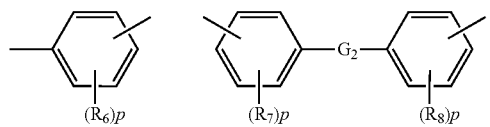

Wherein p is 1 to 4; $R_6$, $R_7$, $R_8$, are selected from the group consisting of hydrogen, halogen, viz. fluoride, chloride, bromide and iodide, alkyl, substituted alkyl such as halogenated alkyls, nitro, cyano, thioalkyl, alkoxy, aryl, or substituted aryl such as halogenated aryls, alkyl ester and substituted alkyl esters and combinations thereof. When p is less than 4 the remaining positions on the aromatic ring are assumed by hydrogen $G_2$ is selected from a group consisting of a covalent bond, a $CH_2$ group, a $C(CH_3)_2$ group, a $C(CF_3)_2$ group, a $C(CX_3)_2$ group wherein X is a halogen; a CO group, an O atom, a S atom, a $SO_2$ group, a $Si(CH_3)_2$ group; 9, 9-fluorene group or substituted 9, 9-fluorene; a OZO group wherein Z is a aryl group or substituted aryl such as phenyl group, biphenyl group, perfluorobiphenyl group, 9, 9-bisphenylfluorene group or substituted 9, 9-bisphenylfluorene. It should be understood that the aromatic polyamide may contain multiple repeat units where $Ar_1$ and $Ar_2$ are the same or different.

According to another aspect of this invention, a transparent aromatic polyamide film is produced containing a multifunctional aromatic carboxylic acid selected from the group comprising:

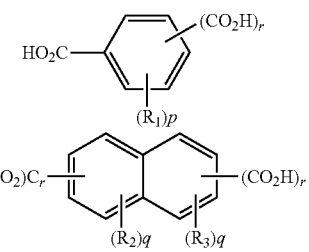

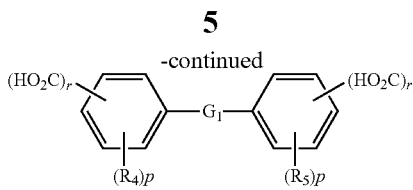

wherein r=1 or 2, and wherein p=3 or 4, q=2 or 3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, alkyl ester and substituted alkyl esters, and combinations thereof. When r is 1 or p is 3 or q is 2 the remaining positions on the aromatic ring are assumed by hydrogen atoms.

$G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group, such as phenyl group, biphenyl group, perfluorobiphenyl group, 9, 9-bisphenyl-fluorene group, and substituted 9, 9-bisphenylfluorene.

According to yet another aspect of this invention a method of preparing a solvent resistant, transparent film is provided having a Tg greater than 300° C. and a CTE less than 40 ppm/° C. comprising the steps of:

a. Reacting an aromatic diamine or a mixture of aromatic diamines with a diacid dichloride or a mixture of diacid dichlorides, in a polar solvent to generate a polyamide solution and free hydrochloric acid;

b. Removing the free hydrochloric acid generated by reaction with an added reagent;

c. Adding a small amount of a multifunctional carboxylic acid and directly casting the resulting polyamide solution into a film at a temperature below 220° C.; or precipitating the polyamide by adding the polyamide solution to a non-polyamide solvent to remove any byproducts generated in the elimination of the free hydrochloric acid, isolating the precipitated polymer, and redissolving it in a polar solvent, adding a small amount of a multifunctional carboxylic acid and casting the resulting polyamide solution into a film at a temperature below approximately 220° C.

d. Heating the film at a temperature above 275° C. near the polyamide Tg for a period of time sufficient for it to become solvent resistant. In most cases, the heating time will not exceed approximately 30 minutes.

It is very surprising that the solvent resistance of a polyamide film can be increased so dramatically in a relatively short period of time by simply heating at a temperature near the polymer Tg. It is especially surprising that such a high temperature does not result in a dramatic increase in the color of the film and a dramatic loss of transparency. Although the process by which the polyamide becomes solvent resistant is not known, it likely involves transamidation reactions between the dispersed carboxylic acid and the polyamide backbone. Such reactions would not be expected to occur under these conditions. It is also surprising that these reactions, which presumably lead to a crosslinked network, do not result in a significant increase in the polymer Tg. Thus, it is not surprising that multifunctional carboxylic acids have not been used as crosslinking agents in the thermal cure of polyamide films.

The polymer substrate films in the present invention expand the utilization of AMOLEDs in portable devices by improving device electrical efficiency and the consumer experienced robustness of the display. In addition to the standard OLED display market, the substrate of the present invention will enable the development of the flexible display market. These displays can be used for conformable displays that can be integrated onto clothing, flexible e-paper and e-book displays, displays for smartcards, and a host of other new applications. For example, the polymer substrate films in the present invention can be used for flexible sensors. The new devices produced from the polymer substrate films in the present invention can dramatically impact daily life, by decreasing the cost and increasing accessibility and portability of information.

Additionally, the aromatic polyamides in the present invention can be prepared in a common organic solvent at low temperatures (approximately −20° C. to about 40° C.). These polymers can be produced in the presence or absence of an inorganic salt. If a salt in not used, the resulting colorless and homogenous polymer solution can be used directly for subsequent film casting. No special polymerization reactor and no polymer isolation procedure are required. However, after the polymers are heated at a temperature near their Tg for several minutes, the polymer films become insoluble and chemically resistant to swelling when exposed to inorganic or organic solvents. Thus, the process should be amenable to scale-up to metric ton quantities.

The aromatic polyamides of the present invention are soluble in polar solvents without the need for the presence of inorganic salts. They can be continuously solution cast directly from their polymerization mixtures using a roll-to-roll process to yield transparent films with thickness greater than 20 μm. The films display high Tgs (>300° C.), low CTEs (<40 ppm/° C.), high transparencies between 400 and 750 nm (a minimum transmittance of 75% at 400 nm; >85% at 750 nm), excellent mechanical properties (tensile strengths>200 MPa), and low moisture absorptions (<2% @ 50% humidity at 69° C.). The films show excellent chemical resistance after they are heated for short periods of time at a temperature anywhere between approximately 10% lower than the Tg and approximately 10% higher than the $T_g$.

The polyamides are prepared by polymerizing one or more aromatic diacid dichlorides as shown in the following general structures:

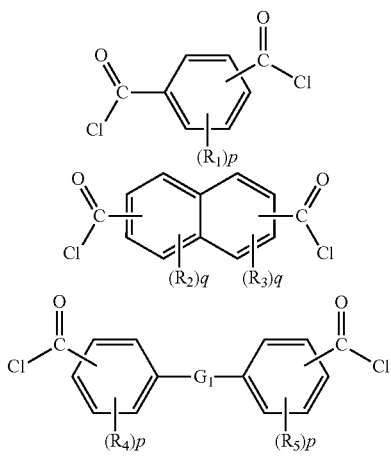

Wherein p is 1 to 4, q is 1 to 3; $R_1, R_2, R_3, R_4, R_5$ are selected from the group consisting of hydrogen, halogen, viz. fluoride, chloride, bromide and iodide, alkyl, substituted alkyl such as halogenated alkyls, nitro, cyano, thioalkyl, alkoxy, aryl, or substituted aryl such as halogenated aryls, alkyl ester and substituted alkyl esters and combinations thereof. When p is less than 4 and q is less than 3 the remaining positions on the aromatic ring are assumed by hydrogen atoms.

$G_1$ is selected from a group consisting of a covalent bond, a $CH_2$ group, a $C(CH_3)_2$ group, a $C(CF_3)_2$ group, a $C(CX_3)_2$ group wherein X is a halogen; a CO group, an O atom, a S atom, a $SO_2$ group, a Si $(CH_3)_2$ group; 9, 9-fluorene group or substituted 9, 9-fluorene; a OZO group wherein Z is a aryl group or substituted aryl such as phenyl group, biphenyl group, perfluorobiphenyl group, 9, 9-bisphenylfluorene group or substituted 9, 9-bisphenylfluorene.

And one or more aromatic diamines as shown in the following general structures:

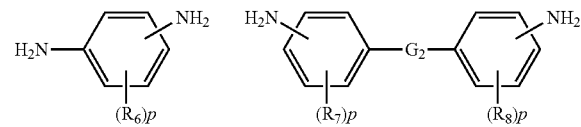

Wherein p is 1 to 4; $R_6, R_7, R_8$, are selected from the group consisting of hydrogen, halogen, viz. fluoride, chloride, bromide and iodide, alkyl, substituted alkyl such as halogenated alkyls, nitro, cyano, thioalkyl, alkoxy, aryl, or substituted aryl such as halogenated aryls, alkyl ester and substituted alkyl esters and combinations thereof. When p is less than 4 the other positions on the aromatic ring are assumed by hydrogen.

$G_2$ is selected from a group consisting of a covalent bond, a $CH_2$ group, a $C(CH_3)_2$ group, a $C(CF_3)_2$ group, a $C(CX_3)_2$ group wherein X is a halogen; a CO group, an O atom, a S atom, a $SO_2$ group, a Si $(CH_3)_2$ group; 9, 9-fluorene group or substituted 9, 9-fluorene; a OZO group wherein Z is a aryl group or substituted aryl such as phenyl group, biphenyl group, perfluorobiphenyl group, 9, 9-bisphenylfluorene group or substituted 9, 9-bisphenylfluorene.

And, whereby, a multifunctional aromatic carboxylic acid is added to the polymerization mixture as shown in the following general structures:

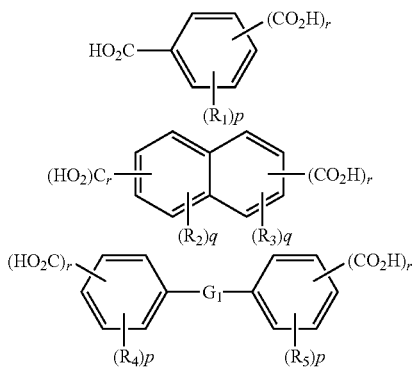

wherein r=1 or 2, and wherein p=3 or 4, q=2 or 3, and wherein $R_1, R_2, R_3, R_4, R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, alkyl ester and substituted alkyl esters, and combinations thereof. It should be understood that when r is 1 or p is 3 or q is 2 the remaining positions on the aromatic ring are assumed by hydrogen atoms.

$G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9, 9-fluorene group; substituted 9, 9-fluorene; and an OZO group, wherein Z is a aryl group or substituted aryl group, such as phenyl group, biphenyl group, perfluorobiphenyl group, 9, 9-bisphenylfluorene group, and substituted 9, 9-bisphenylfluorene;

DETAILED DESCRIPTION

The present invention is directed toward solvent resistant, transparent films prepared from aromatic polyamides that are soluble in organic solvents without the presence of an inorganic salt. A polyamide is prepared via a condensation polymerization of an aromatic diacid chloride with an aromatic diamine in a polar aprotic solvent at approximately −20° C. to about 40° C. The hydrochloric acid generated in the reaction is trapped by reaction with a reagent like propylene oxide (PrO) or an inorganic salt. The preferred solvent is DMAc and the preferred temperature is 0° C. If the reagent used to trap the hydrochloric acid does not form volatile products, the polymer is first isolated from the polymerization mixture by precipitation in a non-solvent and redissolved in a polar solvent (without the need for inorganic salts). The preferred non-solvent is methanol and the preferred solvent is DMAc. If the reagent forms a volatile product by reaction with hydrochloric acid, such as with PrO, films can be cast directly from the polymerization solution, and the volatile by product removed during the removal of solvent. Colorless films can be prepared by well known solvent casting procedures at temperatures below 220° C. Casting can be carried out in a batch process or continuously using a roll to roll process. By carefully manipulating the structure of the monomers, the $T_g$s of the resulting polymers, and the CTEs and optical properties of their solution cast films can be controlled. As evident to those skilled in the art, the use of monomers containing twisted biphenyl structures such as those present in 2,2'-disubstitutedbenzidines results in soluble polymers with high Tgs and low CTEs. Since such structures also result in increased transparency (U.S. Pat. No. 4,384,107, May 1983), they are preferred. The preferred diamines are PFMB and PFOMB or mixtures of these with other aromatic diamines. The use of monomers containing cardo groups such a 9,9'-bis(4-aminophenyl)fluorene affords soluble polymers with very high Tgs. The use of mixtures of aromatic diacid chlorides and aromatic diamines can also be used to promote solubility. Guidelines for the preparation of soluble aromatic polyamides with high Tgs can be found in Y. S. Negi et. al. (1999), Journal of Macromolecular Science, Part C, 39:3, 391-403. The combination of monomers used to promote solubility are chosen so as to result in a polyamide with a Tg above 300° C., a CTE<40 ppm/° C., and one that can be cast into films with high transparencies between 400 and 750 nm (a minimum transmittance of 75% at 400 nm; and greater than 85% at 750 nm). It is preferred that the Tg be above 310° C., the CTE>30 ppm/° C., and the film transmittance>80% at 400 nm. The addition of a multifunctional carboxylic acid to the polymer solutions prior to casting allows the films to be made resistant to dissolution and swelling in organic solvents by heating at temperatures near the polyamide Tg. The amount of multifunctional acid added is less than approximately 10 wt %. The preferred amount is 5 wt % or less. The preferred multifunctional acid is TA. The films containing the multifunctional acid are heated above 275° C. to near the polyamide Tg under an inert atmosphere or under reduced pressure to develop solvent resistance. The time and temperature required depends on the polymer and the amount of multifunctional acid added. There parameters are easily determined for each combination of polymer and acid by holding cure time or temperature constant and varying the other parameter (Table 1).

Representative and illustrative examples of the useful aromatic diacid dichlorides in the invention are:

Terephthaloyl dichloride (TPC);

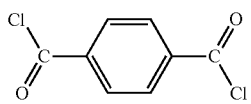

Isophthaloyl dichloride (IPC);

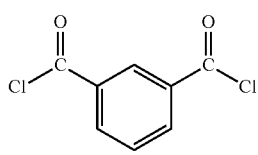 [SMILES: O=C(Cl)c1cccc(C(=O)Cl)c1]

2, 6-naphthaloyl dichloride (NDC);

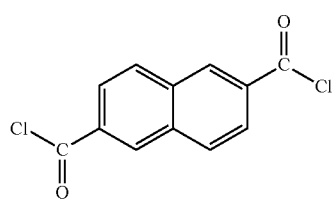 [SMILES: O=C(Cl)c1ccc2cc(C(=O)Cl)ccc2c1]

4, 4-Biphenyldicarbonyl dichloride (BPDC);

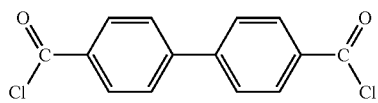

Representative and illustrative examples of the useful aromatic diamines in the invention are:

4, 4'-Diamino-2, 2'-bistrifluoromethylbenzidine (PFMB);

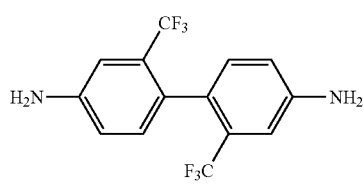

4,4'-Diamino-2,2'-bistrifluoromethoxylbenzidine (PFMOB);

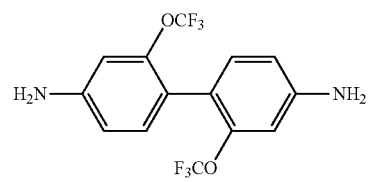

4,4'-Diamino-2,2'-bistrifluoromethyldiphenyl ether (6FODA);

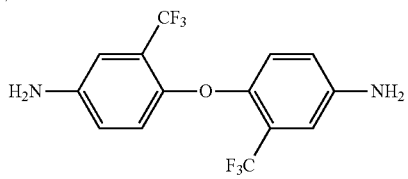

Bis-(4-amino-2-trifluoromethylphenyloxyl)benzene (6FOQDA);

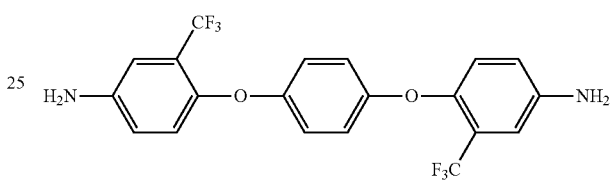

Bis-(4-amino-2-trifluoromethylphenyloxyl)biphenyl (6FOBDA).

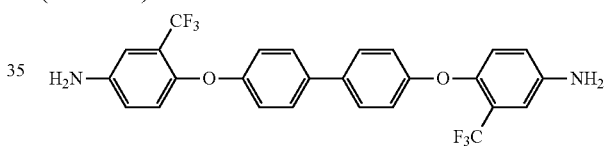

Representative and illustrative examples of the useful multifunctional aromatic acid in the invention are:

Trimesic acid (TA)

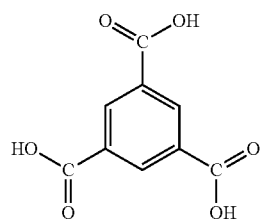 [SMILES: O=C(O)c1cc(C(=O)O)cc(C(=O)O)c1]

2, 4, 6, 8-Naphthyl tetracarboxylic acid (TTNA)

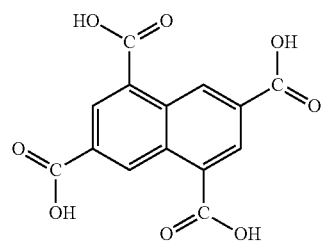 [SMILES: O=C(O)c1cc(C(=O)O)c2cc(C(=O)O)cc(C(=O)O)c2c1]

3, 3', 5, 5'-Biphenyltetracarboxylic acid (BPTA 1)

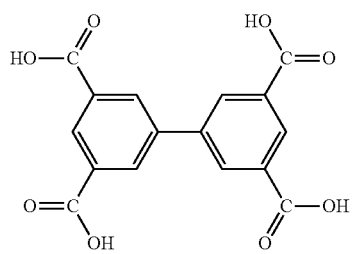 [SMILES: O=C(O)c1cc(C(=O)O)cc(-c2cc(C(=O)O)cc(C(=O)O)c2)c1]

2, 2', 4, 4'-Biphenyltetracarboxylic acid (BPTA 2)

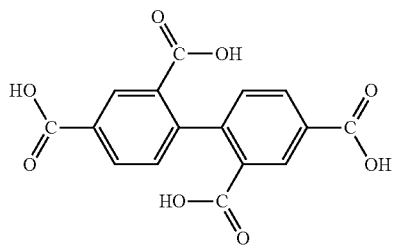 [SMILES: O=C(O)c1ccc(-c2ccc(C(=O)O)cc2C(=O)O)c(C(=O)O)c1]

EXAMPLES

Example 1

This example illustrates the general procedure used to prepare a polyamide solution for film casting directly from monomers.

A polymer solution was prepared from TPC/IPC and PFMB (70/30/100 mol ratio) containing 5% TA (weight ratio to the polymer) in the following manner: To a 250 ml, three necked, round bottom flask, equipped with a mechanical stirrer, a nitrogen inlet, and outlet, was added PFMB (3.2024 g, 0.01 mol) and dried DMAc (45 ml). After the PFMB dissolved completely, the solution was cooled to 0° C. and IPC (0.6395 g 0.003 mol) was slowly added. The flask wall was washed with DMAc (1.5 ml) to insure all of the IPC was transferred to the solution. After 15 minutes, TPC (1.4211 g, 0.007 mol) was slowly added and the flask wall was again washed with DMAc (1.5 ml). The solution quickly became quite viscous and formed a gel. After PrO (1.4 g, 0.024 mol) was added, the gel slowly broke up to form a viscous, homogenous solution. The polymerization mixture was stirred for another 4 hours at 0° C. After TA (0.45 g) was added, the mixture was allowed to warm to room temperature and stirred for another two hours.

Example 2

This example illustrates the general procedure used to prepare polyamide solutions for film casting from preformed polymer.

The polymer solution in Example 1 was added to methanol prior to the addition of TA. The fibrous precipitate that formed was collected by filtration, washed with methanol, and dried. A 10% solids solution was then prepared by dissolving the polymer in DMAC. After 0.45 g of TA was added, the solution was stirred for 1 hr at room temperature.

Example 3

The polymerization described in Example 1 was carried out using 2,6-naphthaloyl dichloride (NDC) in place of TPC. In this case, the mol ratio of NDC/IPC/PFMB was 50/50/100.

Comparative Example 1

The copolymer solution in Example 1 was prepared, but no TA was added.

Comparative Example 2

The copolymer solution in Example 3 was prepared, but no TA was added.

Preparation and Characterization of the Polymer Films

The polyamide solution containing TA prepared in the Examples were used to prepare films. For the preparation of small films in a batch process, the solution is poured on a flat glass plate or other substrate, and the film thickness is adjusted with a doctor blade. After drying on the substrate under reduced pressure at 60° C. for several hours, the film is further dried at 200° C. under a dry nitrogen stream for 1 hour. The film is made solvent resistant by heating at or near the polymer $T_g$ under vacuum or in an inert atmosphere for several minutes. It is to be understood that the film can be heated at any temperature between approximately 10% lower than the Tg and approximately 10% higher than the $T_g$. Mechanical removal from the substrate yields a transparent, free standing film with a thickness greater than approximately 10 µm. The thickness of the free standing film can be increased to as large as approximately 125 µm by adjusting the solids content and the viscosity of the polymer solution. In some instances, the film is cast on a thin substrate such as a woven glass mat or a glass film and not removed, so as to form an polymer impregnated mat or a laminate. The thickness of the substrate is typically approximately 25 µm thick or greater and the thickness of the polyamide film is approximately 5 µm or greater. It is also understood that the batch processes described herein can be modified so that it can be carried out continuously using a roll-to-roll process by techniques known to those skilled in the art.

The film CTE and polyamide $T_g$ are measured with a thermal mechanical analyzer (TA Q 400 TMA) with a load strain of 0.05N. Film samples with a thickness of approximately 20 µm are normally used. In one aspect, the CTE is less than approximately 40 ppm/° C., but it is understood that in other aspects, the CTE is less than approximately 30 ppm/° C. The experimentally derived CTEs are the average of the CTEs obtained from 30° C. to 200° C. The Tg is taken as the extrapolated point at which the CTE undergoes a dramatic increase.

Film transparency is measured by determining the transmittance of a 10 µm thick film from 400 to 750 nm with a UV-Visible spectrometer (Shimadzu UV 2450).

The solvent resistance of the film is determined by immersing it in DMF, DMAC, and NMP for 30 minutes at room temperature. The film is considered solvent resistant if it is substantially free of surface wrinkles, swelling, or any other visible damage after immersion in all three solvents.

The properties of films obtained from the polyamide solutions of Examples 1 and 3 before and after heat treatment are given in Tables 2 and 3, respectively. For comparison purposes, the properties of the films prepared from polyamide solutions not containing TA (Comparative Examples 1 and 2) are also given in Tables 2 and 3.

TABLE 1

Effect of TA Concentration on Cure Temperature at Constant Cure Time (0.5 hr)[1]

| TA Added (wt %) | Cure Temp | | |
|---|---|---|---|
| | 250° C. | 300° C. | 350° C. |
| 9% | No[2] | Yes[3] | Yes |
| 8% | No | Yes | Yes |
| 7% | No | Yes | Yes |
| 6% | No | Yes | Yes |
| 5% | No | No | Yes |
| 4% | No | No | Yes |
| 3% | No | No | Yes |

[1]Film of polymer from Example 1; TPC/IPC/PFMB = 70/30/100.
[2]No: soluble or swellable in polar aprotic solvents.
[3]Yes: solvent resistant to polar aprotic solvents.

TABLE 2

Properties of Film Prepared from Polymer Solutions Obtained in Example 1 and Comparative Example 3.

| | TPC/IPC/PFMB 70/30/100 | | | |
|---|---|---|---|---|
| | w/o TA | | w/5% TA | |
| Heat treatment | None[1] | Yes[2] | None | Yes |
| Tg, ° C. | 322 | 309 | 308 | 313 |
| CTE, ppm/° C., 30-200° C. | 0.65 | 0.6 | 0.38 | 26.9 |
| T% @ 400 nm | 83.4 | 81.6 | 86.1 | 80.4 |
| T% @ 750 nm | 88.9 | 88.9 | 88.7 | 87.9 |
| Dn | −0.1045 | −0.1091 | −0.0942 | −0.0466 |
| Solvent Resistant | No | No | No | Yes |

[1]No heat treatment.
[2]Yes means film was heated at 330° C. for 10 minutes under reduced pressure.

TABLE 3

Properties of Film Prepared from Polymer Solutions Obtained in Example 3 and Comparative Example 4

| | NDC/IPC/PFMB 50/50/100 | | | |
|---|---|---|---|---|
| | w/o TA | | w/5% TA | |
| Heat treatment | None | Yes | None | Yes |
| Tg, ° C. | 316 | 319 | 303 | 313 |
| CTE, ppm/° C., 30-200° C. | 7.6 | 9.3 | 3.4 | 39.7 |
| T% @ 400 nm | 85.2 | 72.1 | 85.1 | 77.1 |
| T% @ 750 nm | 88.7 | 86.8 | 89.2 | 87.7 |
| Dn | −0.1024 | −0.0854 | −0.0955 | −0.0941 |
| Solvent Resistant | No | No | No | Yes |

[1]No heat treatment.
[2]Yes means film heated at 330° C. for 10 minutes under reduced pressure.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A solvent resistant, transparent, aromatic polyamide film, comprising:
   a) an aromatic polyamide that is soluble in polar aprotic solvents in the absence of inorganic salts and has one or more repeat units of general formula (I):

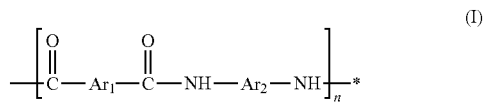

wherein $Ar_1$ is selected from the group of aromatic units as shown in the following general structures:

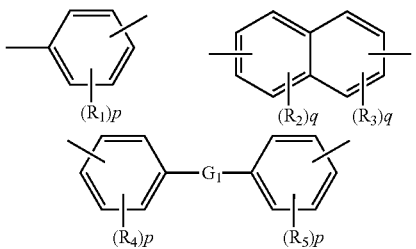

wherein p is 1 to 4, q is 1 to 3; $R_1$, $R_2$, $R_3$, $R_4$, $R_5$ are selected from the group consisting of hydrogen, halogens (fluoride, chloride, bromide and iodide), alkyls, substituted alkyls, nitro, cyano, thioalkyl, alkoxy, aryls, substituted aryls, alkyl esters, substituted alkyl esters, and combinations thereof, wherein when p is less than 1 or q is less than 3 the remaining positions on the aromatic ring are y hydrogen atoms;

wherein $G_1$ is selected from a group consisting of a covalent bond; a $CH_2$ group; a $C(CH_3)_2$ group; a $C(CF_3)_2$ group; a $C(CX_3)_2$ group wherein X is a halogen; a CO group; an O atom; a S atom; a $SO_2$ group; a Si $(CH_3)_2$ group; 9, 9-fluorene group; substituted 9, 9-fluorene; and an OZO group wherein Z is a aryl group or substituted aryl such as phenyl group, biphenyl group, perfluorobiphenyl group, 9, 9-bisphenylfluorene group, or substituted 9, 9-bisphenyl-fluorene;

wherein $Ar_2$ is selected from the group of aromatic units as shown in the following general structures:

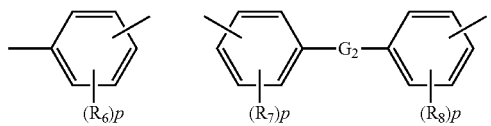

wherein p is 1 to 4; $R_6$, $R_7$, $R_8$, are selected from the group consisting of hydrogen, halogen (fluoride, chloride, bromide and iodide), alkyl, substituted alkyls, nitro, cyano, thioalkyl, alkoxy, aryls, substituted aryls, alkyl esters, substituted alkyl esters, and combinations thereof, wherein when p is less than 4 the remaining positions on the aromatic ring are hydrogen;

wherein $G_2$ is selected from a group consisting of a covalent bond; a $CH_2$ group; a $C(CH_3)_2$ group; a $C(CF_3)_2$ group; a $C(CX_3)_2$ group wherein X is a halogen; a CO group; an O atom; a S atom; a $SO_2$ group; a Si $(CH_3)_2$ group; 9, 9-fluorene group; substituted 9, 9-fluorene; and an OZO group wherein Z is a aryl group or substituted aryl such as phenyl group, biphenyl group, perfluorobiphenyl group, 9, 9-bisphenylfluorene group, or substituted 9, 9-bisphenyl-fluorene, wherein when p is less than 4 the remaining positions on the aromatic ring are hydrogen; and, b) a multifunctional carboxylic acid compound in an amount of about 3 wt % to about 9 wt % based on the weight of the soluble, aromatic polyamide; wherein the multifunctional carboxylic acid compound is selected from the group consisting of: trimesic acid, 2,4,6,8-naphyltetracarboxylic acid, 3,3',5,5'-biphenyltetracar-boxylic acid, and 2,2',4,4'-biphenyltetracarboxylic acid, wherein a precursor film is formed by combining at least the aromatic polyamide and the multifunctional car-boxylic acid compound and wherein the precursor film exposed to temperatures from about 300° C. to less than 350° C. for less than about one hour to form the solvent resistant film with an average coefficient of thermal expansion that is less than 40 ppm/° C. between 30 and 200° C.

2. The solvent resistant, transparent, aromatic polyamide film of claim 1, wherein $Ar_1$ is selected from the following:

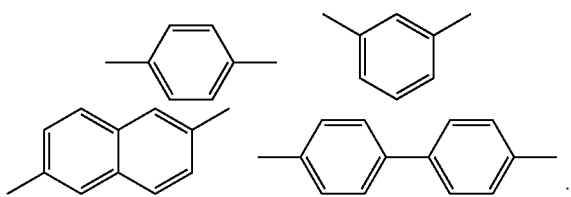

3. The solvent resistant, transparent, aromatic polyamide film of claim 1, wherein $Ar_2$ is selected from the following:

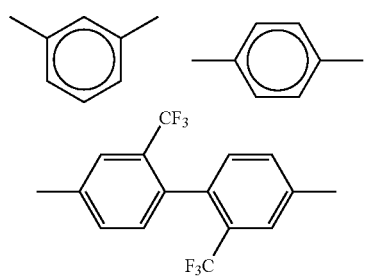

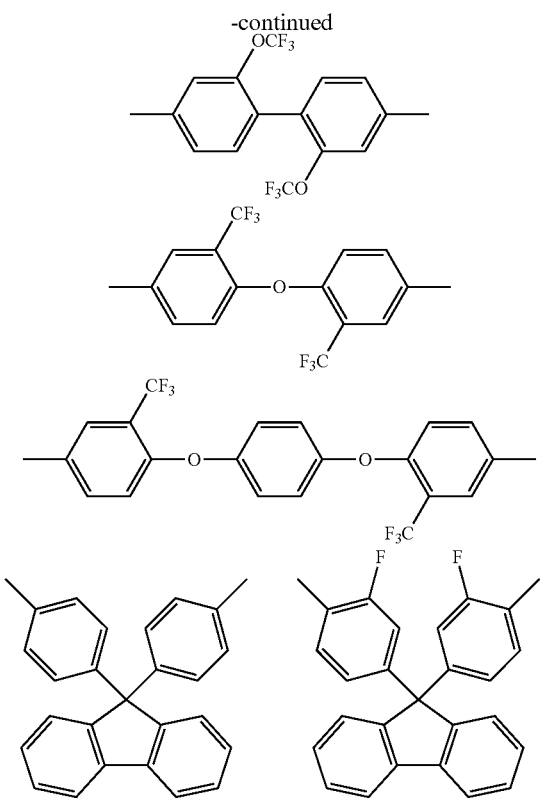

4. The solvent resistant, transparent, aromatic polyamide film of claim 1, wherein the aromatic polyamide has a Tg>300° C.

5. The solvent resistant, transparent, aromatic polyamide film of claim 1, wherein the aromatic polyamide film has a transmittance of about >75% between 400 nm and 750 nm.

6. The solvent resistant, transparent, aromatic polyamide film of claim 5, wherein the transmittance is >80% between 400 nm and 750 nm.

7. The solvent resistant, transparent, aromatic polyamide film of claim 1, wherein the aromatic polyamide film has a thickness that is greater than approximately 5 μm.

8. The solvent resistant, transparent, aromatic polyamide film of claim 7, wherein the thickness is greater than approximately 20 μm.

9. The solvent resistant, transparent, aromatic polyamide film of claim 1, wherein the solvent resistant, transparent, aromatic polyamide film is adhered to a substrate and has a thickness that is greater than approximately 5 μm.

10. The solvent resistant, transparent, aromatic polyamide film of claim 9, wherein the substrate is a woven glass mat or a glass film.

11. The solvent resistant, transparent, aromatic polyamide film of claim 10, wherein the substrate has a thickness that is greater than approximately 20 μm.

12. The solvent resistant, transparent, aromatic polyamide film of claim 1, wherein the average coefficient of thermal expansion of the aromatic polyamide film is less than approximately 30 ppm/° C. between 30 and 200° C.

* * * * *